Oct. 21, 1969    P. E. STRIFLER ET AL    3,473,634
DUAL BRAKE INSTALLATION FOR VEHICLES
Original Filed Dec. 30, 1965

INVENTORS.
PAUL E. STRIFLER
KLAUS DROMETER
DIETER SCARPATETTI

BY Dicke & Craig
ATTORNEYS

United States Patent Office 3,473,634
Patented Oct. 21, 1969

3,473,634
DUAL BRAKE INSTALLATION FOR VEHICLES
Paul E. Strifler, Dettingen, Teck, Klaus Drometer,
Kemnat, and Dieter Scarpatetti, Stuttgart, Germany, assignors to Daimler-Benz Aktiengesellschaft, Stuttgart-Unterturkheim, Germany
Continuation of application Ser. No. 517,678, Dec. 30, 1965. This application Oct. 30, 1968, Ser. No. 772,477
Claims priority, application Germany, Dec. 31, 1964,
D 46,167
Int. Cl. B60t *11/10, 13/00;* F16d *65/14*
U.S. Cl. 188—152                             32 Claims

ABSTRACT OF THE DISCLOSURE

A hydraulically-operated two-circuit brake installation for vehicles having hydraulically-operated vehicle brakes, especially a self-energizing two-circuit brake installation for motor vehicles having front and rear wheels, wherein the two brake-fluid circuits are connected in parallel with each other, including a master brake cylinder provided with two substantially coaxially-disposed cylinder work spaces, pistons in each of said work spaces, said pistons being rigidly connected with each other, each of said cylinder work spaces constituting an element of one of said brake-fluid circuits, and wheel brake cylinders, either of single or double-acting construction, said wheel brake cylinders, including at least two cylinder work spaces, each of which is connected with a different brake-fluid circuit, and pistons acting in each of said work spaces, and a pressure sensing device disposed between said two brake-fluid circuits such that the pistons in said wheel brake cylinders are actuated by the second brake-fluid circuit when a pressure drop occurs in the first brake-fluid circuit; further, the provision of a signal indicator device for producing a warning signal in case of failure of one of the brake-fluid circuits; additionally, the provision of a servo-brake installation leading from the rear wheels to the front wheels of the vehicle, including a servo-brake cylinder operatively connected with the wheel brake cylinder of the rear wheels, the servo-brake cylinder constituted by a stepped portion of the wheel brake cylinders and an annular piston mounted on the piston stem of the wheel cylinder piston, and a refill-line for the servo-brake installation, said refill line having a closure constituted by a piston slide valve which is coupled to the piston of the master brake cylinder.

---

Figure 1:
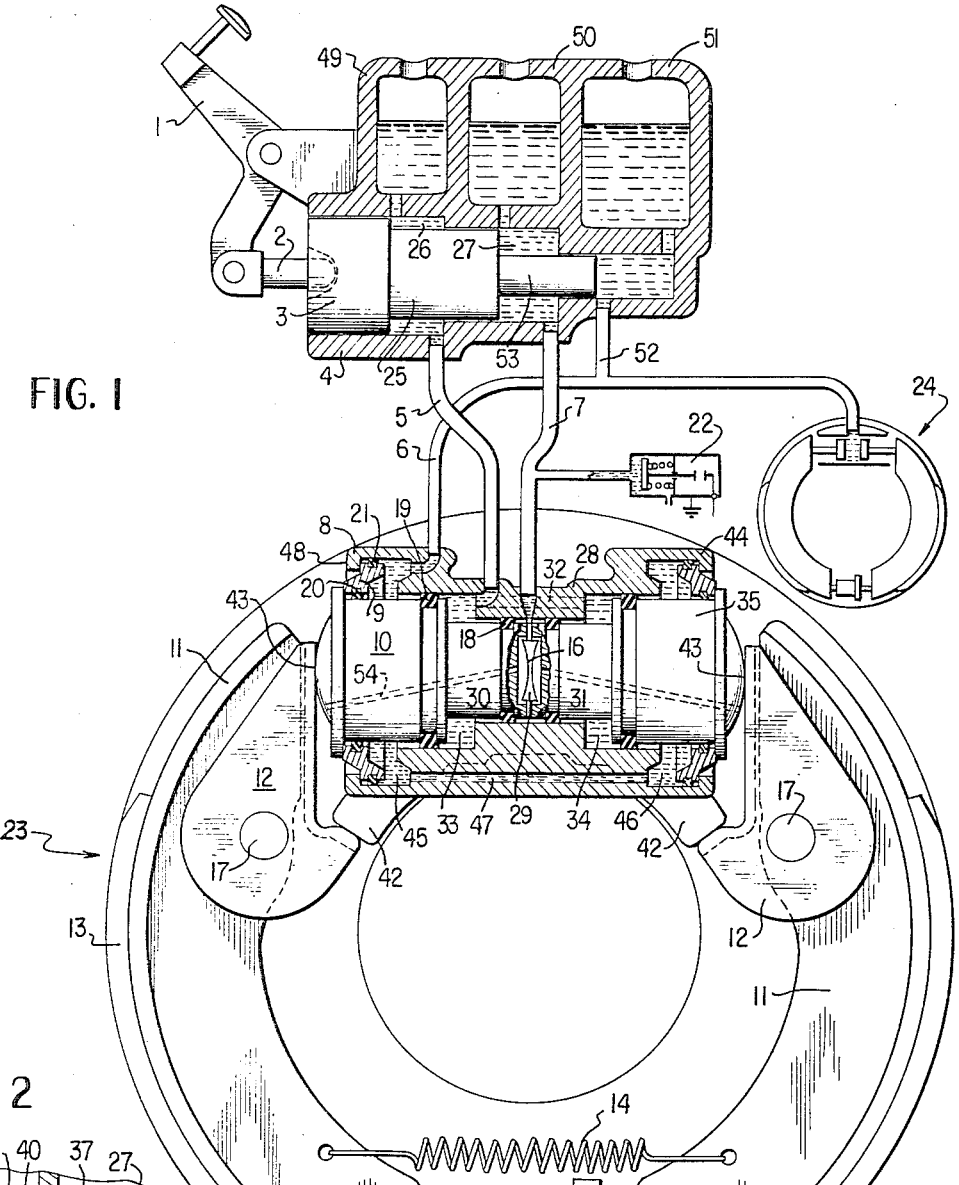

This is a continuation of application Ser. No. 517,678, filed Dec. 30, 1965, and now abandoned.

The present invention relates to a hydraulically actuated brake system for vehicles, and more particularly to a two-circuit brake system for motor vehicles.

For increasing the pressure of a foot-operated hydraulic vehicle servo-brake system, it is necessary that a predetermined volume of the brake fluid is supplied under a predetermined pressure from the master cylinder to the wheel cylinders. The energy necessary therefor has to be produced exclusively by the pedal force of the driver along the pedal path.

Since the brake coefficient C* which expresses the ratio of the brake-drum-circumferential force U to the clamping or tightening force of the brake shoe S $$\left(C^* = \frac{\Sigma U}{\Sigma S}\right)$$

for reasons of sensitivity of the brake cannot lie above a certain value, for example, with servo-brakes above the value of 5, the total vehicle weight which can be braked is also limited.

This becomes noticeable in a disadvantageous manner with two-circuit brake systems if one of the brake fluid circuits fails or becomes inoperative. The master brake cylinder of a conventional two-circuit brake system includes two pistons arranged in a tandem-like manner, one piston for each circuit, and upon failure of one circuit, the associated piston collapses up to its abutment. Since this path has to be also accommodated constructionally in the pedal path, the useful pedal path and therewith the output capacity becomes correspondingly smaller. With the normal distribution of the brake force customary nowadays with two-circuit brake systems of about 50% to 50%, also the working or output capacity of the master brake cylinder is distributed approximately in the ratio of 50:50 to the front and rear axle.

The present invention is concerned with the aim to eliminate the aforementioned disadvantages of two-circuit brake installation. This is achieved according to the present invention with a hydraulically operated, two-circuit brake installation for vehicles, especially with a servo or a self-energizing two-circuit brake installation for motor vehicles, preferably commercial-type vehicles, by a parallely connected arrangement of both brake-fluid circuits. An extraordinarily safe brake installation is created thereby in which also in case of failure of one of the brake-fluid circuits, all the wheels connected to the installation can still be fully braked. Also, in case of failure of one of the brake-fluid circuits, a highly sensitive actuation and an immediate response of the brakes is preserved.

The master brake cylinder of the present invention consists essentially of two coaxially disposed cylinder work spaces having one piston each, whereby the pistons are rigidly connected with each other and one brake-fluid circuit is connected to each cylinder work space. Each wheel brake cylinder connected to the installation of single-acting construction is provided, analogous to the master brake cylinder, with two coaxially disposed cylinder work spaces whose pistons are also rigidly connected with each other. One of these cylinder work spaces is connected with the first brake-fluid circuit and the other with the second brake-fluid circuit. Each of the wheel brake cylinders connected to the installation of double-acting construction is provided with a central cylinder work space which is connected with one of the brake-fluid circuits and includes two oppositely operating pistons, and with two lateral cylinder work spaces, preferably connected with each other by channels, which are connected with the other brake fluid circuit and which include a piston each; whereby the pistons operating in the same direction are rigidly connected with each other.

In one practical construction of the present invention, one of the rigidly connected pistons of the wheel brake cylinder may be equipped at the bottom thereof with a membrane or diaphragm whose backside is relieved. These diaphragms permit a pressure difference between the brake-fluid circuits which effects that with intact brake fluid circuits, only the first circuit becomes effective. The pistons of the wheel brake cylinders equipped with the diaphragms are thereby actuated by the second brake-fluid circuit. It is achieved thereby that the second brake-fluid circuit operates as a pure safety circuit which comes into operation only upon failure of the first brake-fluid circuit. The second brake-fluid circuit is provided with a signal indicator in order to indicate to the driver of the vehicle its operation which signal indicator produces in case of failure of the first brake-fluid circuit a warning signal.

In another practical construction of the present invention the cylinder work spaces of the master brake cylinder may be connected with a pressure equalization chamber by way of channels. The same pressure then prevails continuously in both brake fluid-circuits and the diaphragms may be dispensed with. The pressure equalization chamber may consist of a cylinder space closed on both sides thereof and having a floating piston, held in its center position preferably by coil springs, and may be arranged within the piston of the master brake cylinder. In order to indicate also in this case to the driver the failure of one of the brake-fluid circuits, both circuits are connected with a signal indicator, which is constructed as differential pressure switch and which produces in case of failure of a brake-fluid circuit a warning signal, preferably coordinated to the brake-fluid circuit which has the failure. The differential pressure switch may consist, for example, of two rubber diaphragms, of which each is in communication on one side with one brake-fluid circuit and on the other side mechanically actuates an electric switch by way of intermediate members.

A particularly favorable construction of the rigidly connected piston of the master cylinder and of the wheel brake cylinders is achieved in that they are constructed as stepped pistons. Preferably the effective surfaces of two rigidly connected pistons are equal.

With the application of the present invention to a self-energizing or servo-brake installation, the servo-brake cylinders for the actuation of the self-energized brake installation which, for example, leads from the rear wheel brakes to the front wheel brakes, is operatively connected with the wheel brake cylinders of the rear wheels. The servo-brake cylinders are then constituted by an offset or step of the wheel brake cylinder and by a ring piston displaceably mounted on the piston stem of the piston carrying the mushroom head. Two servo-brake cylinders are arranged at each wheel-cylinder of a rear wheel, whose work spaces are connected by channels, pipes, or lines. The ring pistons are actuated by the projecting rims of mushroom heads and are kept in the outermost end position thereof by abutments provided at the wheel brake cylinders.

According to the present invention the brake-fluid equalization reservoirs or containers for the two-circuit brake installation and the self-energizing brake installation are connected to or combined with the master brake cylinder. Owing to such a construction the closure member for the refilling line of the self-energizing in servo-brake installation can be coupled very simply with the pistons of the master brake cylinder in that the slide valve of the closure member is connected directly with one of the pistons. The slide valve may thereby be a piston slide valve.

Accordingly, it is an object of the present invention to provide a two-circuit brake installation for vehicles, especially motor vehicles which eliminates by simple means the shortcoming and drawbacks encountered with the prior are constructions.

Another object of the present invention resides in a two-circuit brake system for motor vehicles which remains fully operable even in case of failure of one of the circuits.

A further object of the present invention resides in a two-circuit brake installation for vehicles in which the full normally rated vehicle load can be braked even in case of failure of one of the two circuits without exceeding a reasonable value for the brake coefficient.

Still another object of the present invention resides in a two-circuit brake installation for motor vehicles in which the useful pedal path remains substantially unaffected by failure of one of the circuits.

Another object of the present invention resides in a two-circuit brake system which is extraordinarily reliable even in case of failure of one of the circuits while at the same time assuring a highly sensitive actuation and immediate response of the brakes under all operating conditions.

A further object of the present invention resides in a two-circuit brake system for motor vehicles in which the second circuit becomes operable only in case of failure of the first circuit.

Still a further object of the present invention resides in a two-circuit brake system of the type described above in which the driver is at all times fully appraised of the operating conditions of the circuits.

Figure 2:
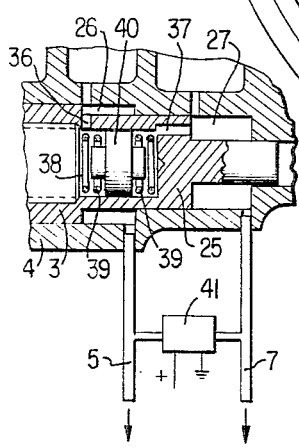

These and further objects, features, and advantages of the present invention will become more obvious from the following description when taken in conection with the accompanying drawing which shows, for purposes of illustration only, one embodiment in accordance with the present invention, and wherein:

FIGURE 1 is a schematic view, partly in cross section, of one embodiment of a self-energizing or servo, hydraulic two-circuit brake installation, with all parts not contributing to the understanding of the present invention omitted for sake of clarity; and FIGURE 2 is a partial schematic cross-sectional view of a pressure equalization chamber for use with the brake installation of FIGURE 1.

Referring now to the drawing wherein like reference numerals are used in the two views to designate like parts, reference numeral 1 designates in FIGURE 1 the brake pedal of conventional construction. The work applied to the brake pedal 1 is utilized exclusively for engaging or tightening the rear-wheel brake generally designated by reference numeral 23. The rigidly connected pistons 3 and 25 of the master brake cylinder 4, which is provided with two coaxially disposed cylinder work spaces 26 and 27, are actuated by way of the brake pedal 1 and the pressure or push rod 2. The pistons 3 and 25 are combined into a single, unitary stepped piston. The brake fluid is forced by way of the brake fluid lines 5 and 7 to the double-acting wheel brake cylinders 28. The effective surfaces of the master-brake-cylinder pistons 3 and 25 are equally large so that an equally large amount of brake fluid is supplied through both lines 5 and 7. The wheel brake cylinder 28 has a central work space 29, which is connected with the second brake fluid circuit, and two lateral cylinder work spaces 33 and 34 connected by way of a channel 32 which are connected to the first brake fluid circuit. Two pistons 30 and 31 operates mutually opposite one another in the center cylinder work space 29. Also, the pistons 10 and 35 of the lateral work spaces 33 and 34 operate against one another, i.e., in mutually opposite directions. The pistons 10 and 30 and pistons 35 and 31 which operate in the same direction are connected rigidly with each other and are constructed as stepped pistons. The effective piston surfaces of both steps are equally large A membrane or diaphragm 16 is provided at the piston bottom of each step having the smaller diameter, whose backsides are relieved by way of the relief bores 54. If now, by actuation of the brake pedal 1, brake fluid is forced into the wheel brake cylinder 28, then the diaphragm 16 yields and the second brake fluid circuit remains pressureless. Only in case of pressure-loss in the first brake fluid circuit, the pressure increases in the second circuit, the diaphragm 16 abuts against the piston bottom, and the second circuit takes over the tightening or clamping work of the brakes. Since the additionally required brake-fluid volume for the abutment of the diaphragm 16 is minimal, the change of the pedal position occurring with a break in the line 5 of the first circuit is so small that the drive of the vehicle does not notice this operation. For that reason, a signal indicator 22 of any conventional construction is connected to the line 7 of the second brake-fluid circuit, which is constructed as pressure switch to indicate, in case of failure of the first-brake fluid circuit, the pressure increase in the second brake-fluid cricuit by means of a warning signal.

In order to be able to supervise both brake-fluid circuits, the installation may be provided with a pressure equalization chamber 38 as shown in FIGURE 2. The pressure equalization chamber 38 is arranged within the pistons 3 and 25 of the master brake cylinder 4 and is in communication by way of channels 36 and 37 with the two brake fluid circuits. A floating piston 40 is disposed in the chamber 38 which is returned to its center position by the coil spirngs 39 and which equalize possible smaller pressure differences in the circuits. Both brake-fluid circuits are connected to a signal indicator 41 which is constructed as conventional differential pressure switch and which produces a warning signal in case of large differences in the pressures of the circuits. The diaphragms 16 may be dispensed with in such an installation. The particular advantage of this installation resides in that in case of failure of one of the brake fluid circuits, the intact circuit suffers no work- or brake-volume-loss.

The engaged or tightened brake shoes 11 transmit the braking moment to the brake drum. The reaction moment seeks to take along the brake shoes 11 which is prevented by the abutment force. The abutment force is transmitted, according to a further feature of the present invention, by way of the bolts 17, which are supported or mounted in the brake shoes 11, to the two-armed abutments levers 12. One lever-arm of the lever 12 rests or abuts against a nose-like projection 42 at the wheel brake cylinder wall, and the other against the mushroom head 43 of a wheel cylinder piston 10 or 35.

The servo-brake cylinders for the actuation of the self-energized or servo-brake installation, which leads in the illustrated embodiment from the rear wheel brakes 23 by way of the line 6 to the front wheel brakes 24, are combined with the wheel brake cylinders 28 of the rear wheels. In a particularly favorable arrangement, according to the present invention, each wheel brake cylinder is provided with two servo-brake cylinders 8 and 44, whose work spaces 45 and 46 are connected by way of the channel 47. The servo-brake cylinders 8 and 44 are thereby constituted each by an offset or step of the wheel-brake cylinder 28 and by a ring piston 9 displaceably mounted on the piston stem of the piston 10 or 35, respectively, carrying the mushroom head 43. The ring pistons 9 are actuated by the projecting rims of the mushroom heads 43 and are kept in the outermost end position thereof by abutments 48 provided at the wheel brake cylinders. The ring pistons 9 are, when the stepped pistons 10 and 35 are in the zero position, in the outermost end position thereof. The rims of the mushroom heads 43 effectuate that a portion of the abutment force, which is transmitted by the lever 12 to the stepped pistons 10 and 35 is absorbed by the stepped pistons and a portion by the ring pistons 9. A respective stepped piston and a corresponding ring piston 9 will move in unison for such length of time in the direction of the brake-shoe disengagement or relief until the front wheel brakes generally designated by reference numeral 24 are engaged or tightened by the work of the servo-pistons 9.

The second ring piston 9 thereby rests by the abutment 48 in its end position and the second stepped piston may, which is a particular feature of the present invention, continue to move without thereby absorbing or receiving brake fluid in its working space.

The brake fluid equalization reservoirs 49 and 50 for the two-circuit brake installation and the reservoir 51 for the self-energizing brake installation are connected to or attached at the master brake cylinder 4. As a result thereof, the closure member for the refilling line 52 of the self-energizing brake installation may be constructed in a very simple manner as piston slide valve 53 and may be directly coupled with the pistons 3 and 25 of the master brake cylinder 4. Thus, a third step results at the stepped piston which serves only for the closing of the refill bore of the servo-line 6.

Reference numerals 18, 19, 20 and 21 designate the piston rings of the wheel brake cylinder pistons. The brake shoes 11 are provided, in a known manner, with brake linings 13 and with an adjustable joint 15. Upon removal of the pedal force, the return spring 14 returns the brake shoes 11 and therewith also the wheel cylinder pistons into the initial position thereof.

While we have shown and described one embodiment in accordance with the present invention, it is understood that the same is not limited thereto but is susceptible of nuemerous changes and modifications as known to a person skilled in the art; and we therefore do not wish to be limited to the details shown and described herein but intend to cover all such changes and modifications as are known to a person skilled in the art.

What is claimed is:

1. A hydraulically-operated two-circuit brake installation for vehicles having hydraulically-operated vehicle brakes, especially a self-energizing two-circuit brake installation for motor vehicles having front and rear wheels, comprising:

first brake-fluid circuit means,
second brake-fluid circuit means,
master brake cylinder means provided with two substantially coaxially-disposed cylinder work spaces, piston means in each of said work spaces, said piston means being rigidly interconnected, each of said piston means within said cylinder work spaces constituting an element of one of said brake-fluid circuit means,
wheel brake cylinder means provided with at least two substantially coaxially disposed cylinder work spaces, piston means in each of said last-mentioned cylinder work spaces, said piston means being rigidly interconnected, one of said last-mentioned cylinder work spaces being operatively connected with said first brake-fluid circuit means and the other of said last-mentioned cylinder work spaces being operatively connected with said second brake-fluid circuit means,
pressure-responsive means associated, on one side thereof, with a face of one of said rigidly-connected piston means of a wheel brake cylinder means and means for relieving the opposite side of said pressure-responsive means, disposed between said first brake-fluid circuit means and said second brake-fluid circuit means such that said piston means associated with said pressure-responsive means is activated by said second brake-fluid circuit means only upon failure of said first brake-fluid circuit means,
and means for actuating the vehicle brakes, each of said brake-fluid circuit means being operatively connected, in parallel with each other, with said means for actuating the vehicle brakes.

2. A combination according to claim 1, wherein said pressure-responsive means includes diaphragm means.

3. A combination according to claim 1, further comprising signal indicator means operatively connected with said second brake-fluid circuit means for producing a warning signal in case of failure of the first brake-fluid circuit means.

4. A combination according to claim 1, further comprising signal indictor means opertaively connected with both of said brake-fluid circuit means, said indicator means including differential pressure-activated switch means for producing a warning signal coordinated to the brake-fluid circuit in which a failure occurs.

5. A combination according to claim 1, further comprising a
pressure equalization chamber means and channels operatively connecting said equalization chamber means with said cylinder work spaces of said master brake cylinder means.

6. A combination according to claim 5, wherein said equalization chamber means includes a cylinder space closed on both sides thereof and containing a floating piston therein and spring means for balancing said floating piston in the center position thereof, said equilization chamber means being arranged within the piston means of said master brake cylinder means.

7. A combination according to claim 1, wherein said wheel brake cylinder means are of single-acting construction.

8. A combination according to claim 7, wherein said rigidly-connected piston means of said master-brake cylinder means and of said wheel brake cylinder means are constructed as stepped pistons.

9. A combination according to claim 8, wherein the effective surfaces of said rigidly-connected pistons are equally large.

10. A combination according to claim 1, wherein said wheel brake cylinder means are of double-acting construction, each including a central cylinder work space operatively connected to one of said brake-fluid circuit means, two piston means disposed within said central cylinder work space, operating in opposite directions, two lateral cylinder work spaces operatively interconnected, said lateral cylinder work spaces being operatively connected with the other of said brake-fluid circuit means, one piston means disposed within each of said two lateral cylinder work spaces, each of said last-mentioned piston means being rigidly connected with the one of said two piston means in said central cylinder work space which operates in the same direction therewith.

11. A combination according to claim 10, wherein said pressure-responsive means includes diaphragm means.

12. A combination according to claim 10, further comprising signal indictaor means operatively connected with said second brake-fluid circuit means for producing a warning signal in case of failure of the first brake-fluid circuit means.

13. A combination according to claim 10, further comprising signal indicator means operatively connected with both of said brake-fluid circuit means, said indicator means including differential pressure-activated switch means for producing a warning signal coordinated to the brake-fluid circuit in which a failure occurs.

14. A combination according to claim 10, wherein said rigidly-connected piston means of said master brake cylinder means and of said wheel brake cylinder means are constructed as stepped pistons.

15. A combination according to claim 14, wherein the effective surfaces of said rigidly-connected pistons are equally large.

16. A combination according to claim 15, further comprising signal indicator means operatively connected with both of said brake-fluid circuit means, said indicator means including differential pressure-activated switch means for producing a warning signal coordinated to the brake-fluid circuit means in which a failure occurs.

17. A combination according to claim 10, wherein said means for actuating the vehicle brakes includes brake shoe means having pivotally-supported abutment lever means in the form of a two-armed lever, a nose-like projection at a wall of said wheel brake cylinder means, mushroom head means at a piston means in said wheel brake cylinder means, one lever arm of said abutment lever means engaging with said nose-like projection and the other with said mushroom head means.

18. A combination according to claim 17, further comprising a servo-brake installation including brake-fluid passages through which braking force exerted upon the rear wheels of the vehicle is transmitted to the front wheels of the vehicle and servo-brake cylinder means for the actuation of said servo-brake installation operatively connected with said wheel brake cylinder means of the rear wheels.

19. A combination according to claim 18, including two servo-brake cylinder means arranged at each wheel brake cylinder means of a rear wheel, the working spaces of said two servo-brake cylinder means being operatively interconnected.

20. A combination according to claim 19, wherein said wheel brake cylinder means are of stepped configuration, said servo-brake cylinder means being formed by a stepped portion thereof and an annular piston displaceably mounted on the stem of the piston of said wheel brake cylinder means equipped with said mushroom head means.

21. A combination according to claim 20, wherein said mushroom head means are provided with projecting rims, said annular piston being actuated by said projecting rims and being held in the outermost end positions against abutments provided therefor at said wheel brake cylinder means.

22. A combination according to claim 18, further comprising brake fluid equalization reservoir means for the two-circuit brake installation and said servo-brake installation arranged at said master brake cylinder means.

23. A combination according to claim 22, further comprising a refill line for said servo-brake installation, closure means for said refill line, said closure means coupled to said piston means of said master brake cylinder means.

24. A combination according to claim 23, wherein said closure means is formed by a piston slide valve member.

25. A combination according to claim 1, wherein said means for actuating the vehicle brakes includes brake shoe means having pivotally-supported abutment lever means in the form of a two-armed lever, a nose-like projection at a wall of said wheel brake cylinder means, mushroom head means at a piston means in said wheel brake cylinder means, one lever arm of said abutment lever means engaging with said nose-like projection and the other with said mushroom head means.

26. A combination according to claim 25, further comprising a servo-brake installation including brake-fluid passages through which braking force exerted upon the rear wheels of the vehicle is transmitted to the front wheels of the vehicle and servo-brake cylinder means for the actuation of said servo-brake installation operatively connected with said wheel brake cylinder means of the rear wheels.

27. A combination according to claim 26, including two servo-brake cylinder means arranged at each wheel brake cylinder means of a rear wheel, the working spaces of said two servo-brake cylinder means being operatively interconnected.

28. A combination according to claim 27, wherein said wheel brake cylinder means are of stepped configuration, said servo-brake cylinder means being formed by a stepped portion thereof and an annular piston displaceably mounted on the stem of the piston of said wheel brake cylinder means equipped with said mushroom head means.

29. A combination according to claim 28, wherein said mushroom head means are provided with projecting rims, said annular piston being actuated by said projecting rims and being held in the outermost end positions against abutments provided therefor at said wheel brake cylinder means.

30. A combination according to claim 26, further comprising brake fluid equalization reservoir means for the two-circuit brake installation and said servo-brake installation arranged at said master brake cylinder means.

31. A combination according to claim 30, further comprising a refill line for said servo-brake installation, closure means for said refill line, said closure means coupled to said piston means of said master brake cylinder means.

32. A combination according to claim 31, wherein said closure means is formed by a piston slide valve member.

References Cited

UNITED STATES PATENTS

| | | | |
|---|---|---|---|
| 2,178,490 | 10/1939 | Nielsen | 92—92 |
| 3,067,842 | 12/1962 | Smith | 188—152 |
| 3,305,051 | 2/1967 | Maurice | 188—152 |

FOREIGN PATENTS 951,906  3/1964  Great Britain.

GEORGE E. A. HALVOSA, Primary Examiner

U.S. Cl. X.R.

60—54.5; 188—106; 303—6